US012787920B2

(12) United States Patent
Fredenburg et al.

(10) Patent No.: US 12,787,920 B2
(45) Date of Patent: Nov. 10, 2026

(54) IMPLEMENT HEIGHT SELECTION TOOL FOR A GROUNDS MAINTENANCE VEHICLE

(71) Applicant: EXMARK MANUFACTURING COMPANY INCORPORATED, Beatrice, NE (US)

(72) Inventors: Michael Shane Fredenburg, Hickman, NE (US); Patrick D. Sands, Firth, NE (US)

(73) Assignee: EXMARK MANUFACTURING COMPANY INCORPORATED, Beatrice, NE (US)

(*) Notice: Subject to any disclaimer, the term of this patent is extended or adjusted under 35 U.S.C. 154(b) by 1212 days.

(21) Appl. No.: 17/562,267

(22) Filed: Dec. 27, 2021

(65) Prior Publication Data

US 2022/0201933 A1 Jun. 30, 2022

Related U.S. Application Data

(60) Provisional application No. 63/131,200, filed on Dec. 28, 2020.

(51) Int. Cl.
*A01D 34/74* (2006.01)
*A01D 34/66* (2006.01)
*A01D 101/00* (2006.01)

(52) U.S. Cl.
CPC ........... *A01D 34/74* (2013.01); *A01D 34/661* (2013.01); *A01D 2101/00* (2013.01)

(58) Field of Classification Search
CPC .............................. A01D 34/74; A01D 34/661
See application file for complete search history.

(56) References Cited

U.S. PATENT DOCUMENTS

| | | | | |
|---|---|---|---|---|
| 4,869,057 A * | 9/1989 | Siegrist | .................. | A01D 34/64 56/15.8 |
| 7,596,936 B2 | 10/2009 | Schick | | |
| 8,919,087 B2 * | 12/2014 | Lancaster | ............. | A01D 34/74 56/15.8 |
| 9,516,809 B2 | 12/2016 | Wright et al. | | |
| 2013/0074467 A1 * | 3/2013 | Zwieg | .................... | A01D 34/74 56/229 |
| 2014/0083069 A1 | 3/2014 | Berglund | | |

(Continued)

FOREIGN PATENT DOCUMENTS

GB 2367475 A * 4/2002 ............. A01D 34/74

*Primary Examiner* — Justin C Mikowski
*Assistant Examiner* — Ashley A Kaercher
(74) *Attorney, Agent, or Firm* — Mueting Raasch Group

(57) ABSTRACT

A grounds maintenance vehicle has an implement coupled to a vehicle frame. Some aspects relate to a height selection tool configured to change a vertical position of the implement relative to the frame. The height selection tool has a first pivotable shaft, a first bell crank rigidly coupled to the first shaft, a second bell crank pivotably coupled to the frame, and a first rigid linkage coupling the first bell crank and the second bell crank. A first spring has a first end fixed to the frame and a second end fixed to the first rigid linkage. Other aspects relate to a height selection tool that has a latch and a latch release. Yet other aspects relate to a bracket that pivotably couples two shafts to the vehicle frame, where the bracket allows pivoting of each of the shafts and fixes the locations of the shafts relative to each other.

19 Claims, 11 Drawing Sheets

(56) References Cited

U.S. PATENT DOCUMENTS

| | | | | |
|---|---|---|---|---|
| 2014/0260162 | A1* | 9/2014 | Lancaster | A01D 34/006 56/17.1 |
| 2021/0105938 | A1* | 4/2021 | Fredenburg | A01D 34/283 |

* cited by examiner

IMPLEMENT HEIGHT SELECTION TOOL FOR A GROUNDS MAINTENANCE VEHICLE

This application claims the benefit of U.S. Provisional Application No. 63/131,200, filed 28 Dec. 2020, the disclosure of which is incorporated by reference herein in its entirety.

TECHNOLOGICAL FIELD

The present disclosure is generally related to a vehicle. More particularly, the present disclosure is related to a grounds maintenance vehicle.

BACKGROUND

Grounds maintenance vehicles such as lawn mowers, aerators, and spreader/sprayers are commonly used by homeowners and professionals alike. These vehicles are typically configured as walk-behind or ride-on vehicles having an attached implement (such as a grass cutting deck), where the implement is secured to a frame of the grounds maintenance vehicle. The height of the implement is generally adjustable relative to the vehicle frame and the ground. Some designs provide for manual adjustment of the height of the implement relative to the vehicle frame such as by a manually-adjustable position fastener associated with the implement that abuts the frame to set the desired height. The implement's weight exerts a force on the position fastener to, at least in part, secure the connection. Furthermore, such vehicles may incorporate a transport lock system that locks the position of the implement to the vehicle frame for transport of the vehicle. The implement can be locked in a position vertically above the maximum operating height of the implement to safeguard clearance between the implement and the ground surface during transport.

SUMMARY

The technology disclosed herein generally relates to a grounds maintenance vehicle. The vehicle has a vehicle frame and an implement coupled to the vehicle frame. A height selection tool is configured to change a vertical position of the implement relative to the vehicle frame. The height selection tool has a first shaft pivotably coupled to the vehicle frame and a first bell crank rigidly coupled to the first shaft. The first bell crank defines a first implement arm extending radially outward from the first shaft and a first linkage arm extending radially outward from the first shaft. A second bell crank is pivotably coupled to the vehicle frame about a first axis. The second bell crank defines a second implement arm extending radially outward from the first axis and a second linkage arm extending radially outward from the first axis. A first rigid linkage couples the first linkage arm and the second linkage arm. The implement is coupled to the first implement arm and the second implement arm. A first spring has a first end fixed to the vehicle frame and a second end fixed to the first rigid linkage.

In some such embodiments, an angle between the first spring and a plane defined by the second bell crank is no more than 15 degrees. Additionally or alternatively, an angle between the first spring and a plane defined by the second bell crank is no more than 10 degrees. Additionally or alternatively, the vehicle has a first bracket fixed to the vehicle frame, where the first bracket has a first bearing surface defining a first shaft opening. The first shaft is pivotably disposed in the first shaft opening, and the first bracket has a second bearing surface defining a second shaft opening and another shaft is pivotably disposed in the second shaft opening. Additionally or alternatively, The implement hangs from the first and second implement arms under the force of gravity.

Additionally or alternatively, the vehicle has a third bell crank rigidly coupled to the first shaft, where the third bell crank defines a third implement arm extending radially outward from the first shaft and a third linkage arm extending radially outward from the first shaft. A fourth bell crank is pivotably coupled to the vehicle frame about a second axis. The fourth bell crank defines a fourth implement arm extending radially outward from the second axis and a second linkage arm extending radially outward from the second axis. A second rigid linkage couples the third linkage arm and the fourth linkage arm, where the implement is coupled to the third implement arm and the fourth implement arm. In some such embodiments, the second bell crank is fixed to a second shaft that is pivotably coupled to the vehicle frame and the fourth bell crank is fixed to a third shaft that is pivotably coupled to the vehicle frame. Additionally or alternatively, the vehicle has a second spring having a first end fixed to the vehicle frame and a second end fixed to the second rigid linkage.

Additionally or alternatively, the height selection tool has a pivotable handle fixed to the first shaft. Additionally or alternatively, the height selection tool has a locking mechanism configured to obstruct rotation of the first shaft beyond a particular selected orientation among a plurality of selectable orientations. Additionally or alternatively, the handle, the first shaft, and the first bell crank are pivotable about a rotational axis.

Some embodiments relate to a grounds maintenance vehicle having a vehicle frame, an implement coupled to the vehicle frame, and a height selection tool configured to change a vertical position of the implement relative to the vehicle frame. The height selection tool has a handle pivotably coupled to the vehicle frame, where pivoting of the handle relative to the vehicle frame changes the vertical position of the implement relative to the vehicle frame. The handle has a latched position at a maximum vertical distance between the implement and a horizontal ground surface and unlatched positions. The handle defines a latch engagement surface. A latch is pivotably coupled to the vehicle frame. The latch is configured to engage the latch engagement surface of the handle in the latched position and be disengaged from the handle in the unlatched positions. A latch release is configured to push the latch out of engagement with the latch engagement surface. A manually engageable button is coupled to the handle in operative communication with the latch release.

In some such embodiments, the latch defines a handle engagement surface configured to oppose the latch engagement surface. Additionally or alternatively, the handle engagement surface is within 45 degrees from vertical when in a latched position. Additionally or alternatively, the latch release has a retracted position and an extended position, and the latch release is biased in the retracted position and latch release is configured to extend alongside the latch engagement surface in the extended position. Additionally or alternatively, the latch is biased in a first orientation and the latch release is configured to counteract the latch bias to pivot the latch to a second orientation to push the latch out of engagement with the latch engagement surface.

Additionally or alternatively, the vehicle has one or more rods defining the latch release and the manually engageable button. Additionally or alternatively, the latch release includes a forked rod. Additionally or alternatively, the latch release defines parallel release surfaces configured to make contact with opposite sides of the latch to push the latch. Additionally or alternatively, the vehicle has a spring compressed between the latch release and the handle between the parallel release surfaces.

Some embodiments relate to a grounds maintenance vehicle having a vehicle frame and drive wheels rotatably coupled to the vehicle frame. A first shaft is pivotably coupled to the vehicle frame. A first bracket and a second bracket are fixed to the vehicle frame. Each bracket has a first bearing surface defining a first shaft opening and a second bearing surface defining a second shaft opening. The first shaft is disposed in the first shaft opening. A brake shaft is pivotably disposed in the second shaft opening of the first bracket and the second bracket. The brake shaft has a first end and a second end. A brake component is fixed to the first end of the brake shaft, where the brake component is rotatable between a first position and a second position. In the first position the brake component is in frictional engagement with a drive wheel and in the second position the brake component is outside of frictional engagement with the drive wheel.

In some such embodiments the vehicle has an implement coupled to the vehicle frame and a height selection tool configured to change a vertical position of the implement relative to the vehicle frame, where the height selection tool includes the first shaft. Additionally or alternatively, the height selection tool has a pivotable handle fixed to the first shaft. Additionally or alternatively, the vehicle has a translatable handle and a mechanical communication chain extending from the handle to the brake shaft, where translation of the handle elicits pivoting of the brake shaft. Additionally or alternatively, the translatable handle is pivotable about a handle axis.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE DRAWINGS

The present technology may be more completely understood and appreciated in consideration of the following detailed description of various embodiments in connection with the accompanying drawings.

Figure 1:
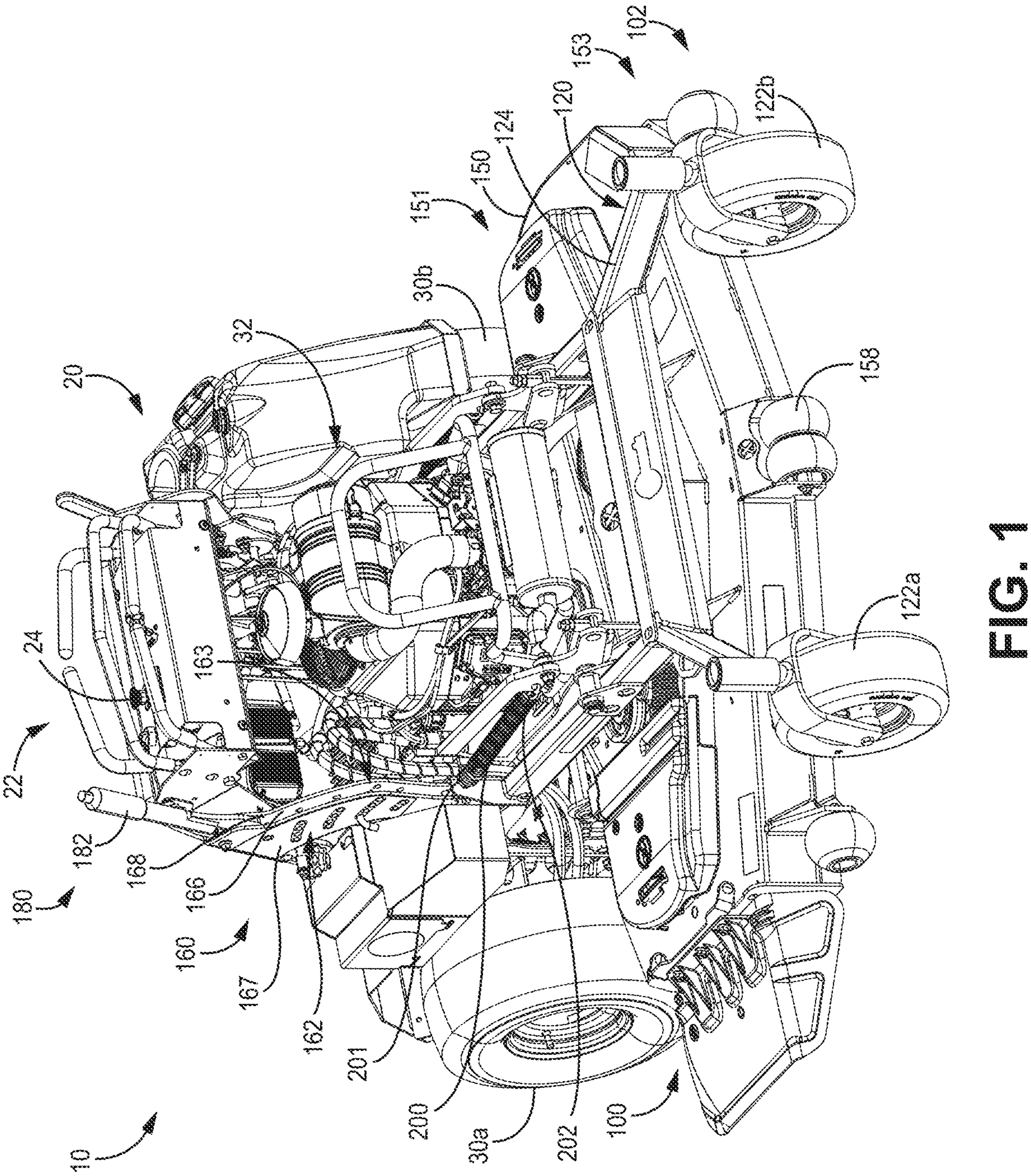
FIG. 1 is a perspective view of an example vehicle consistent with embodiments.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

In the following detailed description of illustrative embodiments, reference is made to the accompanying figures of the drawing which form a part hereof. It is to be understood that other embodiments, which may not be described and/or illustrated herein, are certainly contemplated.

All headings and subheadings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

It is also noted that the term "comprises" (and variations thereof) does not have a limiting meaning where this term appears in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or from the perspective of one operating the vehicle while it is in an operating configuration. The numerical descriptors such as "first," "second," and "third" are used herein to distinguish components having similar names and should not be interpreted as limiting the location or function of the particular component referenced. Each term is used only to simplify the description and is not meant to limit the interpretation of any embodiment described.

The suffixes "a" and "b" may be used with element numbers throughout this description to denote various left- and right-side parts/features, respectively. The parts/features denoted with "a" and "b" suffixes can be substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature and may correspond to a reference numeral on a drawing that is accompanied by a letter suffix.

Figure 2:
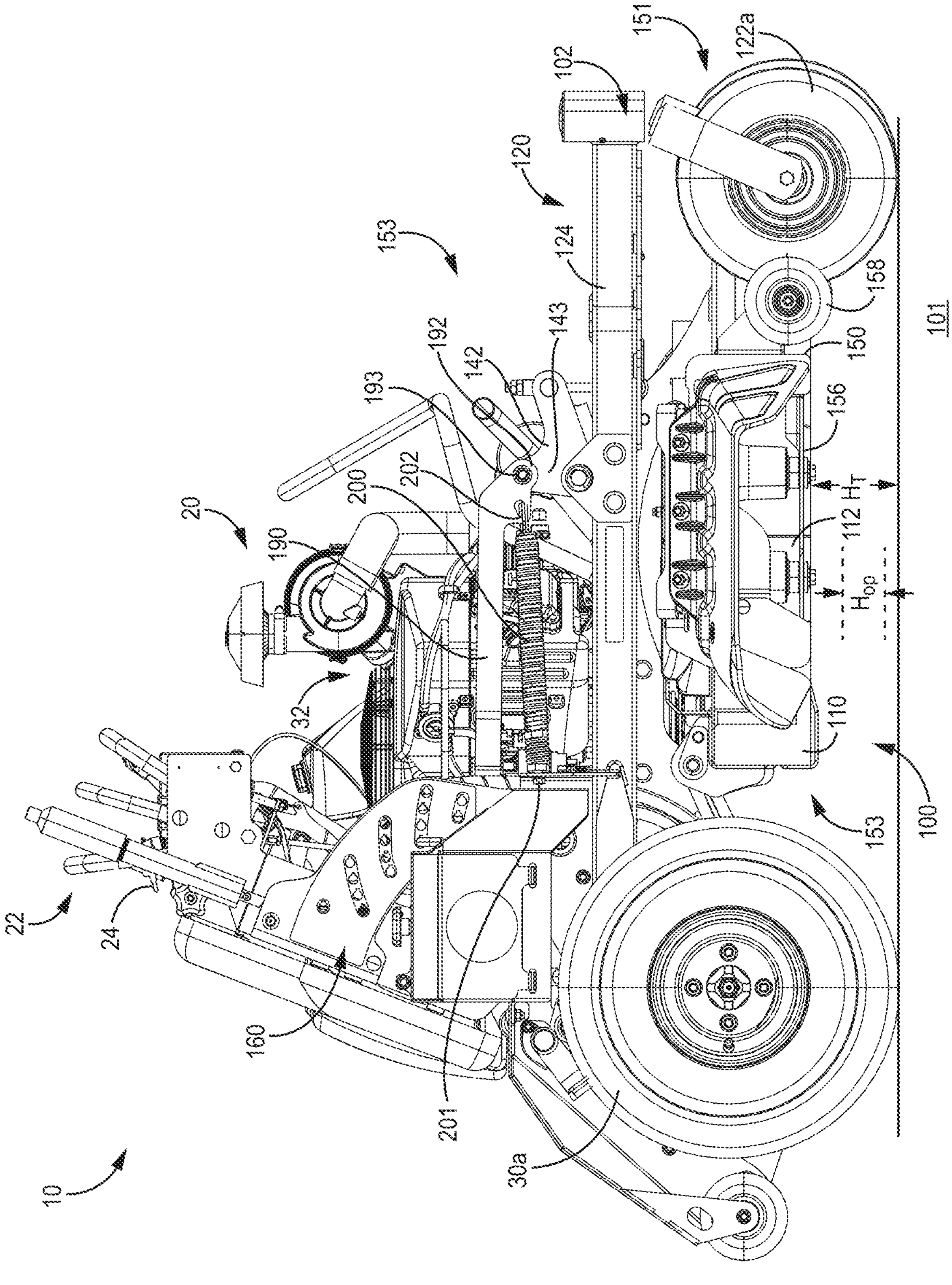
FIG. 2 is side view of the example vehicle of FIG. 1.

With reference to the figures, where like reference numerals designate like parts and assemblies throughout the several views, FIG. 1 illustrates a perspective view of an example grounds maintenance vehicle 10 in accordance with the present disclosure, which can simply be referred to as a "vehicle". FIG. 2 depicts a first side view of the example vehicle 10 of FIG. 1. The vehicle 10, in the current example, is a standing lawn mower. While embodiments are described herein with respect to such a mower, this disclosure is equally applicable to mowers having alternate configurations (e.g., walk-behind mowers and riding mowers). The embodiments also apply to other types of grounds maintenance vehicles (e.g., aerators, dethatchers, debris management systems, blowers, vacuums, sweepers, general purpose utility vehicles, etc.) without limitation.

The vehicle 10 has a first portion that is an implement assembly 100 and a second portion that is a drive assembly 20. A vehicle frame assembly 120 is generally configured to support the drive assembly 20, the implement assembly 100, and other components of the vehicle 10.

The vehicle frame assembly 120 has a vehicle frame 124. A first ground engaging member 122*a* and a second ground engaging member 122*b* are disposed between the vehicle frame 124 and the ground surface 101 (FIG. 2). The ground engaging members 122*a*, 122*b* are generally configured to accommodate translation of the vehicle frame 124 across the ground surface 101. In the current example, the ground engaging members 122*a*, 122*b* are wheels that are rotatably coupled to the vehicle frame 124. More particularly, the ground engaging members 122*a*, 122*b* are caster wheels that rotate (for rolling) and swivel (for turning) and are coupled to a front end 102 of the vehicle frame 124. In some embodiments, the ground engaging members can be alternate structures or components other than caster wheels such as tracks, rollers, or drive wheels.

The drive assembly 20 is supported by the vehicle frame assembly 120. The drive assembly 20 is generally configured to propel the vehicle 10 for use. The drive assembly 20 of the grounds-maintenance vehicle 10 can have drive wheels 30*a*, 30*b* and a prime mover 32 (e.g., internal combustion engine or electric motor) that are configured to selectively propel the vehicle 10 across the ground surface 101. The drive assembly 20 can have handles 22 by which the vehicle 10 is directed and controlled by an operator. The drive assembly 20 can also have various controls 24 that can be manipulated by the operator to adjust various operating conditions.

The implement assembly 100 is generally configured to couple to, or be integrally formed with, a grounds maintenance vehicle. The implement assembly 100 is generally configured to perform a maintenance task on a surface, such as the ground surface 101. The implement assembly 100 has an implement 150 having a first implement end 151 and a second implement end 153 and is generally configured for operational interaction with the ground surface 101. In this example, the first implement end 151 is the back end of the implement 150 and the second implement end 153 is the front end of the implement 150. In the current example, the implement 150 is configured to be disposed between at least a portion of the vehicle frame assembly 120 and the ground surface 101.

In the current example, where the vehicle 10 has an implement assembly 100 that is a lawn mower assembly, the implement 150 is a cutting deck having a housing 110 defining a cutting chamber 112 (FIG. 2). Cutting blades 156 are rotatably disposed in the cutting chamber 112. As stated above, other cutting decks (e.g., belly-mounted decks, towed decks, reel units, etc.), as well as other implements, are contemplated within the scope of this disclosure. During operation, power is selectively delivered to the cutting blades 156 by the engine, whereby the blades 156 rotate at a speed sufficient to sever grass and other vegetation over which the deck passes.

The implement 150 can have a plurality of rollers 158 (e.g., anti-scalp rollers) configured to be disposed between the implement 150 and a ground surface 101 to limit contact between the implement 150 and the ground surface 101. The plurality of rollers 158 can be configured to obstruct contact between the implement 150 and the ground surface 101 to reduce scalping of the ground surface 101 as the implement 150 translates across the ground surface 101.

A pre-selected operating height $H_{op}$ is defined between the implement 150 and the ground surface 101 for a specific height-of-cut setting. FIG. 2 depicts the implement 150 at a transport height $H_T$ consistent with an engaged transport lock system, which will be described in more detail below. However, FIG. 2 also depicts an example range of operating heights $H_{op}$ between the implement 150 and the ground surface 101. The operating height $H_{op}$ can be selected by a user through a height selection tool 160. The height selection tool 160 is configured to change a default vertical operating position of the implement 150 relative to the vehicle frame 124, which changes the pre-selected operating height $H_{op}$. An example specific configuration of the height selection tool will be described in more detail below with reference to FIG. 3.

It is noted that, during operation, the actual operating height of the implement 150 relative to the ground surface 101 can vary from the pre-selected operating height $H_{op}$. For example, the actual operating height of the implement 150 can be less than the pre-selected operating height $H_{op}$ at locations where a portion of the ground surface 101 under the implement 150 has a height that exceeds the height of the portion of the ground surface 101 under the ground engaging members 122 of the vehicle frame assembly 120 (e.g. as is common with undulating turf). Similarly, the actual operating height of the implement 150 relative to the ground surface 101 can be greater than the pre-selected operating height $H_{op}$ at locations where a portion of the ground surface 101 under the implement 150 dips below the height of the portion of the ground surface 101 under the ground engaging members 122 and drive wheels 30 of the vehicle frame assembly 120. Also, it is noted that, in some implementations, portions of the implement 150 may translate vertically upward towards the vehicle frame assembly 120 (which decreases the distance between the implement 150 and the vehicle frame assembly 120) to accommodate an uneven ground surface 101 such as where an undulation pushes the implement 150 upward. As such, for purposes of the present disclosure, the pre-selected operating height $H_{op}$ of the implement 150 relative to the ground surface 101 is the distance between the cutting blade and a horizontal ground surface 101 when the vehicle 10 is entirely positioned on the horizontal ground surface 101.

Figure 3:
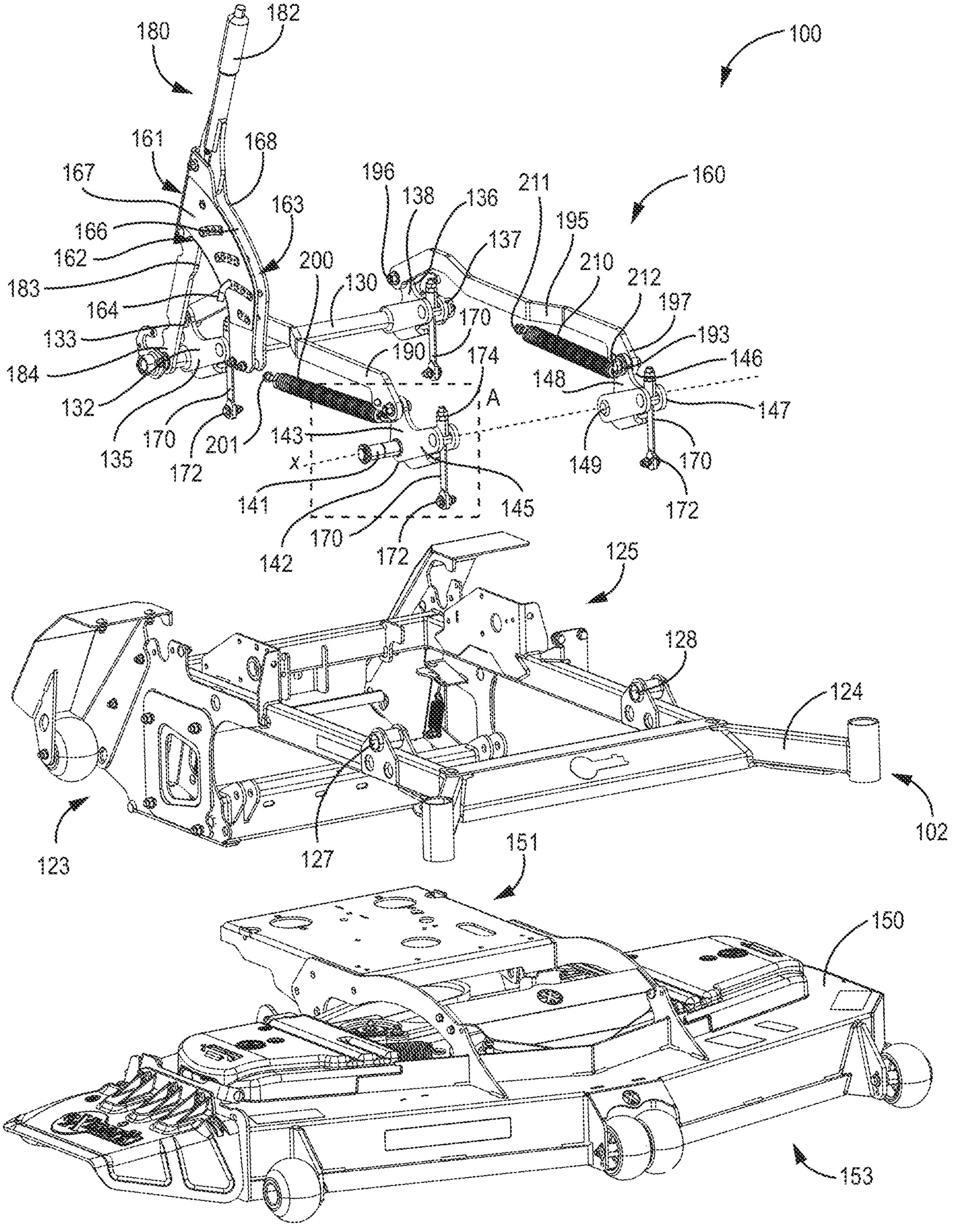
FIG. 3 is an exploded view of an example vehicle consistent with embodiments.
Figure 4:
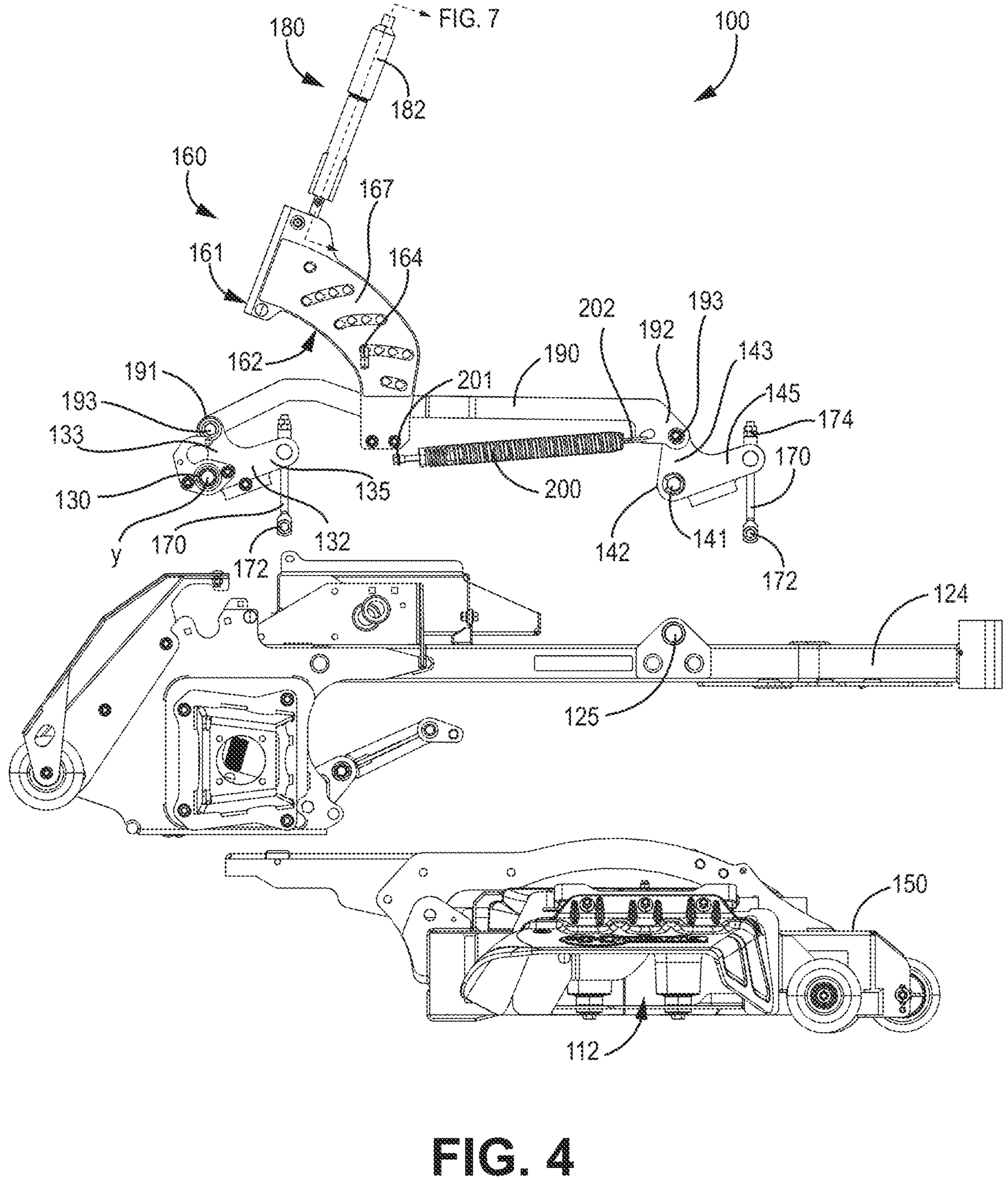
FIG. 4 is a side view of the exploded view of FIG. 3.

FIG. 3 an exploded view of an example implement assembly 100, such as the example implement assembly 100 of the vehicle 10 depicted in FIGS. 1 and 2. FIG. 4 is a side view of the exploded view of FIG. 3. The implement assembly 100 includes the vehicle frame 124, the implement 150, and a height selection tool 160. The implement 150 is generally coupled to the vehicle frame 124.

The height selection tool 160 is configured to change and set the vertical position of the implement 150 relative to the vehicle frame 124, as described above. In various embodiments, the implement 150 is coupled to the vehicle frame 124 via the height selection tool 160. The height selection tool 160 generally has a first shaft 130, a first bell crank 132, a second bell crank 142, a first rigid linkage 190, and a first spring 200.

The first shaft 130 is pivotably coupled to the vehicle frame 124. The first shaft 130 is generally configured to pivot relative to the vehicle frame 124 and is part of a mechanical communication chain that changes the vertical position of the implement 150 relative to the vehicle frame 124. The first shaft 130 extends from a first side 123 of the vehicle frame 124 to a second side 125 of the vehicle frame 124. The first shaft 130 is coupled to the implement 150 towards the first implement end 151. More specifically, the first shaft 130 is coupled to the implement 150 via the first bell crank 132.

The first bell crank 132 and a second bell crank 142 are generally configured to change the vertical position of at least a portion of the implement 150 relative to the vehicle frame 124 in response to pivoting of the first shaft 130. The first bell crank 132 is rigidly coupled to the first shaft 130. As such, pivoting of the first shaft 130 results in equal pivoting of the first bell crank 132. The second bell crank 142 is pivotably coupled to the vehicle frame 124 and is pivotable about a rotational axis x (FIG. 3), which is referred to as the "first" rotational axis herein. In particular, the second bell crank 142 is rigidly coupled to a second shaft 141 that is pivotably coupled to the vehicle frame 124. The second shaft 141 shares the first rotational axis x with the second bell crank 142. More particularly, the second shaft 141 is rotatably disposed in a shaft opening 127 defined by the vehicle frame 124. Bearings can be positioned in the shaft opening 127 between the second shaft 141 and the vehicle frame 124. In some alternate embodiments, the second bell crank 142 can be rotatably disposed on a shaft that is rigidly fixed to the vehicle frame 124. In some such examples, bearings can be positioned between the shaft and the second bell crank 142.

Figure 5:
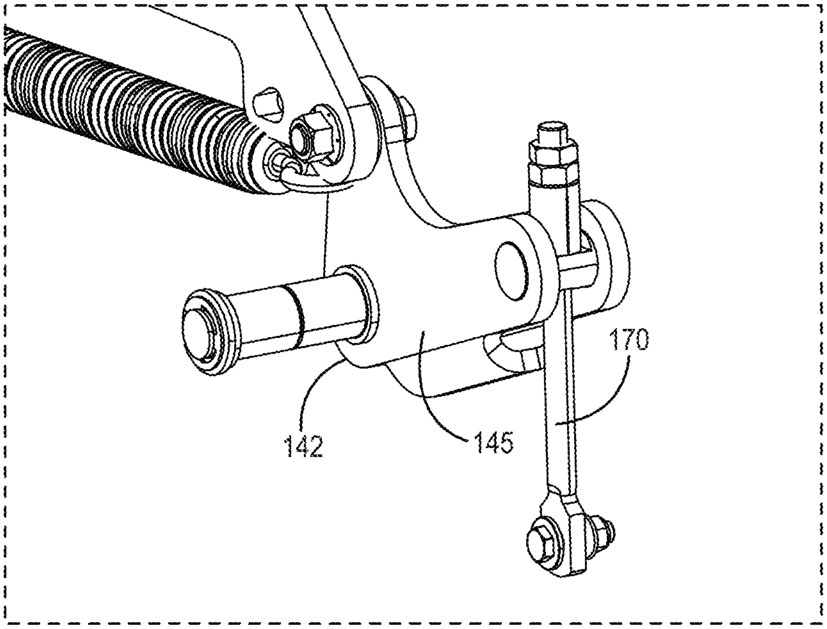
FIG. 5 is detail view A of FIG. 3.

The first bell crank 132 has a first implement arm 135 extending radially outward from the first shaft 130. The second bell crank 142 has a second implement arm 145 extending radially outward from the first rotational axis x. The implement 150 is coupled to the first implement arm 135 and the second implement arm 145. The first (e.g., back) implement end 151 of the implement 150 is coupled to the first implement arm 135 and the second (e.g., front) implement end 153 is coupled to the second implement arm 145 via coupling structures 170. The coupling structures 170 are pivotably coupled to each of the first implement arm 135, the second implement arm 145 and the implement 150. In particular, a first end 172 of each coupling structure 170 is pivotably coupled to the implement 150. Towards a second end 174, the coupling structure 170 is pivotably coupled to the first implement arm 135. In the current example, each coupling structure 170 is a trunnion that is pivotably disposed between a pair of bars forming each implement arm 135, 145, which is more clearly visible in the detail view A of the second bell crank 142 depicted in FIG. 5. In other embodiments, the coupling structures can be different components such as rods coupled with metal links, chains, cables, plates with slots, or other linkages that allows the implement to hang via gravity from the vehicle frame assembly 120.

The first bell crank 132 is also configured to transmit rotational motion from the first shaft 130 to the second bell crank 142. In particular, a first rigid linkage 190 couples first bell crank 132 to the second bell crank 142. The first linkage 190 is generally configured to translate rotational motion of the first shaft 130 such that the first bell crank 132 and the second bell crank 142 rotate in unison. In particular, the first bell crank 132 has a first linkage arm 133 extending radially outward from the first shaft 130. The first linkage arm 133 and the first implement arm 135 extend in different radial directions from the first shaft 130. The second bell crank 142 has a second linkage arm 143 extending radially outward from the first rotational axis x. The second linkage arm 143 and the second implement arm 145 extend in different radial directions relative to the first rotational axis x. The first linkage 190 has a first end 191 that is pivotably coupled to the first linkage arm 133 and a second end 192 that is pivotably coupled to the second linkage arm 143. As such, if the first shaft 130 is rotated, that rotation is mechanically translated to the first bell crank 132 and the second bell crank 142. The locations at which the first linkage 190 and the first and second bell cranks 132, 142 are coupled are referred to as joints 193 (visible in FIG. 4). The joints 193 can be defined by a bolt, for example.

As is visible in FIG. 3, in the current embodiment the height selection tool 160 has a third bell crank 136 and a fourth bell crank 146 that are configured similarly to the first bell crank 132 and the second bell crank 142, respectively. The third bell crank 136 and the fourth bell crank 146 are also configured to change the vertical position of at least a portion of the implement 150 relative to the vehicle frame 124 in response to pivoting of the first shaft 130. The third bell crank 136 is rigidly coupled to the first shaft 130. As such, pivoting of the first shaft 130 results in equal pivoting of the third bell crank 136. The fourth bell crank 146 is pivotably coupled to the vehicle frame 124 and is pivotable about the first rotational axis x. In particular, the fourth bell crank 146 is rigidly coupled to a third shaft 149 that is pivotably coupled to the vehicle frame 124. The third shaft 149 can be configured to rotate about the first rotational axis x. More particularly, the third shaft 149 is rotatably disposed in a third shaft opening 128 defined by the vehicle frame 124. The fourth bell crank 146 can be coupled to the vehicle frame 124 through other approaches similar to those discussed with reference to the second bell crank 142. Further, in some embodiments the second bell crank 142 and the fourth bell crank 146 can be coupled to the vehicle frame 124 via a single separate shaft, where each of the second bell crank 142 and the fourth bell crank 146 are rotatably disposed on the single separate shaft. In such an implementation the single separate shaft can be fixed to the vehicle frame 124.

The third bell crank 136 has a third implement arm 137 extending radially outward from the first shaft 130 and the fourth bell crank 146 has a fourth implement arm 147 extending radially outward from the first rotational axis x. The implement 150 is also coupled to the third implement arm 137 and the fourth implement arm 147. The first (e.g., back) implement end 151 of the implement 150 is coupled to the third implement arm 137 and the second (e.g., front) implement end 153 is coupled to the fourth implement arm 147 via coupling structures 170. The coupling structures 170 are consistent with those described above with respect to the first and second bell cranks 132, 142.

In various embodiments, the third bell crank 136 is also configured to transmit rotational motion from the first shaft 130 to the fourth bell crank 146. In particular, a second rigid linkage 195 couples third bell crank 136 to the fourth bell crank 146 that, similar to the first linkage 190, is configured to translate rotational motion such that the third bell crank 136 and the fourth bell crank 146 rotate in unison. In particular, the third bell crank 136 has a third linkage arm 138 extending radially outward from the third shaft 149. The third linkage arm 138 and the third implement arm 137 extend in different radial directions from the first shaft 130. The fourth bell crank 146 has a fourth linkage arm 148 extending radially outward from a rotational axis, which can be colinear with the first rotational axis x. The fourth linkage arm 148 and the fourth implement arm 147 extend in different radial directions relative to the first rotational axis x. The second linkage 195 has a first end 196 that is pivotably coupled to the third linkage arm 138 and a second end 197 that is pivotably coupled to the fourth linkage arm 148. As such, if the first shaft 130 is rotated, that rotation is mechanically translated to the third bell crank 136 and the fourth bell crank 146.

In various embodiments, the first implement arm 135, the second implement arm 145, the third implement arm 137, and the fourth implement arm 147 are parallel. In various embodiments, the first linkage arm 133, the second linkage arm 143, the third linkage arm 138, and the fourth linkage arm 148 are parallel.

In various embodiments, the implement 150 hangs from the first end 172 of each of the coupling structures 170 under the force of gravity. The weight of the implement 150 applies a rotational force on the implement arms 135, 145, 137, 147 of the respective bell cranks 132, 142, 136, 146 and on the first shaft 130. To maintain the implement at a particular operating height, the height selection tool 160 is configured to oppose the rotational force exerted on the first shaft 130 by the weight of the implement 150 to maintain the vertical position of the implement 150 relative to the ground surface 101 and the vehicle frame 124, which will be described in more detail herein.

The manually engageable mechanism 180 is fixed to the first shaft 130. The manually engageable mechanism 180 is generally configured to change the elevation of the implement 150. The manually engageable mechanism 180 is configured to pivot the first shaft 130 in response to manual operation by a user. The manually engageable mechanism 180 has an engagement end 182 configured for manual engagement by a user and a coupling end 184 (visible in FIG. 3 but omitted from FIG. 4 for clarity of other components) fixed to the first shaft 130 adjacent the first bell crank 132. In some embodiments the manually engageable mechanism can be fixed to a second shaft. In some embodiments the manually engageable mechanism can be fixed to the first linkage 190. The manually engageable mechanism is currently shown as a lever, but in alternate embodiments the manually engageable mechanism can be a button, a touch screen, or that like, which can be in operative communication with an electric or hydraulic actuator.

In various embodiments including the one depicted, the engagement end 182 of the manually engageable mechanism 180 is a pivotable handle 180 that is configured to be manually adjusted by the hand of a user. In some alternate embodiments, the engagement end of the manually engageable mechanism 180 can be a foot pedal that defines a stepping feature that is configured to be manually depressed by the foot of a user. In embodiments incorporating a stepping feature, such a stepping feature can be configured to be accessible by the user during operation of the vehicle. In the example of FIG. 1, the engagement end 182 is proximate handles 22 and controls 24 where a user's hands are positioned when a user is operating the vehicle 10. In another example consistent with a riding mower, a manually engageable mechanism can be positioned within or adjacent to a foot well of the vehicle, adjacent to where the operator's foot would be positioned.

The manually engageable mechanism 180 is particularly configured to pivot the first shaft 130, the first bell crank 132 and the second bell crank 142 in unison via the first linkage 190, but other configurations are certainly possible to achieve such functionality. In some alternate embodiments the first shaft 130 and the second bell crank 142 can be in mechanical rotating communication via gears. As mentioned above, the manually engageable mechanism 180 can be fixed to the first linkage 190 in some embodiments or directly coupled to the second shaft 141 in other embodiments.

To change the vertical position of the implement 150 in a system such as FIG. 2, a user can grasp the engagement end 182 of the manually engageable mechanism 180 and pivot the mechanism 180 counterclockwise relative to FIG. 4, which rotates the first shaft 130 and, therefore, the bell cranks, counterclockwise in unison. The counterclockwise rotation of the first shaft 130 pivots each of the second ends 174 of the coupling structures 170 upwards in unison, which lifts the implement 150 to a particular vertical position. A locking mechanism 161 can be selectively engaged to define each of a plurality of discrete operating heights $H_{op}$ (visible in FIG. 2) between the implement 150 the ground surface 101, which corresponds to a vertical position of the implement 150 relative to the vehicle frame 124. The locking mechanism 161 will now be described.

The locking mechanism 161 generally defines the plurality of height settings 162, which are each selectable by a user. The plurality of height settings 162 can be discrete locations defined by the vehicle frame 124. Each pin opening in the first plurality of pin openings 162 defines a discrete height setting, which defines a limit on the distance between the implement 150 and the vehicle frame 124 and/or the ground surface 101. In various examples, a locking pin 164 is configured to be manually removed from one pin opening of the first plurality of pin openings 162 and manually inserted into another pin opening of the first plurality of pin openings 162 to change the vertical position of the implement 150 relative to the vehicle frame 124 and/or the ground surface 101. In particular, the locking pin 164 of the height selection tool 160 is inserted into a pin opening of the first plurality of pin openings 162 to define (1) the limit on the distance (or the maximum distance) between the implement 150 relative to the vehicle frame 124 at that particular height setting and (2) the pre-selected operating height $H_{hop}$ of the implement 150 relative to the ground surface 101.

In various implementations, when engaged at each discrete height setting, the height selection tool 160 prevents downward vertical translation of the implement 150 below the selected height setting. Accordingly, in the current example when the locking pin 164 is positioned in each of the first plurality of pin openings 162 the locking pin 164 obstructs translation of the implement 150 downward, below the particular pre-selected operating height $H_{op}$ defined by the height setting. There are various configurations that would allow this functionality.

In examples consistent with the current embodiment, the locking pin 164 opposes the rotational force exerted on the first shaft 130 by the weight of the implement 150 on the bell cranks, which retains the first shaft 130 in a particular orientation against gravity. Indeed, the height selection tool 160 is configured to retain the first shaft 130 in any one selected orientation among a plurality of discrete selectable orientations about a second rotational axis y (FIG. 4) to define a corresponding plurality of discrete vertical positions of the implement 150 relative to the vehicle frame 124. More particularly, the height selection tool 160 defines a pin pathway 166 that the locking pin 164 is configured to extend through when received by one or more pin openings corresponding to a particular height setting. As best visible in FIGS. 1 and 3, height selection tool 160 has a first panel 167 defining a first plurality of pin openings 162 on one side of the pin pathway 166 and a second panel 168 defining an aligned plurality of pin openings 163 on an opposite side of the pin pathway 166. Each of the first panel 167 and the second panel 168 are fixed to the vehicle frame 124 and form a portion of the vehicle frame 124. When pivoted about the second rotational axis y, the manually engageable mechanism 180 is configured to translate through the pin pathway 166.

The locking pin 164 is configured to obstruct translation of the manually engageable mechanism 180 along the pin pathway 166 beyond a point that would result in lowering the implement 150 below the selected height setting. In particular, the manually engageable mechanism 180 has a leading surface 183 that is configured to receive the locking pin 164 when the locking pin 164 is disposed in one pin opening of the plurality of pin openings 162 across the pin pathway 166. The locking pin 164 is configured to obstruct pivoting of the manually engageable mechanism 180 in a clockwise direction about the second rotational axis y beyond the locking pin 164. That is to say, the locking pin 164 obstructs pivoting of the first shaft 130 in the direction that would result in lowering the implement 150 below the selected height setting (e.g., clockwise). Each pin opening corresponds to a particular orientation of the first shaft 130 relative to the second rotational axis y that results in a discrete implement height setting. In various embodiments the locking pin 164 obstructs rotation of the first shaft 130 in only one direction about the second rotational axis y (e.g., clockwise), and permits rotation of the first shaft 130 in the opposite direction about the second rotational axis y (e.g., counterclockwise).

To set the height setting of the implement 150, a user can grasp the engagement end 182 and pull the manually engageable mechanism 180 to pivot the mechanism 180 counterclockwise about the second rotational axis y. Pivoting the manually engageable mechanism 180 eliminates forces on the locking pin 164 by the leading surface 183 of the mechanism 180, which allows the user to engage the height selection tool 160 by removing and repositioning the locking pin 164 in the first plurality of pin openings 162. The manually engageable mechanism 180 can then be released by the user to lower the implement 150 to the selected vertical position, at which point the leading surface 183 of the manually engageable mechanism 180 rotates into contact with the locking pin 164, which obstructs the manually engageable mechanism 180 from further pivoting beyond the locking pin 164. It is noted that the locking pin 164, in the current example, does not prevent counterclockwise rotation of the first shaft 130 and/or translation of the implement 150 upward.

The height selection tool can have various alternate configurations. In some embodiments a height selection tool is a plurality of pin openings mutually defined by a vehicle frame and a first linkage (190). In such embodiments, the pin receiving surface of the first linkage can be a plurality of pin openings. In such embodiments, a pin is configured to be received by a pin opening on the vehicle frame and an aligned pin opening on the first linkage. In such embodiments the pin prevents translation of the first linkage relative to the vehicle frame, which prevents rotation of a first shaft and, therefore, prevents vertical translation of an implement in a downward direction. In this way, the maximum vertical distance between the implement and a ground surface and the implement and the vehicle frame can be set. Alternatively, the first linkage can have an extension defining a translation pathway, where the translation of such extension is configured to be obstructed by a locking pin. In some other embodiments, instead of having pin openings defining discrete height settings, the vehicle can have height settings that are continuous. In one such example, when an implement is at the desired operating height, the manually engageable mechanism 180 is clamped to the vehicle frame 124. Other configurations are also contemplated.

In accordance with embodiments disclosed herein, under static conditions the height selection tool 160 is generally maintained under shear and/or compressive forces between the implement 150 and the vehicle frame 124. As discussed above, in order to set the operating height of the implement 150, it may be necessary or desirable to first release the forces on the locking pin 164 before the locking pin 164 is moved to a second height setting by pivoting the manually engageable mechanism 180 away from the locking pin 164 (here, in a counterclockwise direction). Various configurations can be employed to provide users with a mechanical advantage to overcome the weight of the implement 150 in order to pivot the manually engageable mechanism 180 away from the locking pin 164. Various implementations of the technology disclosed herein incorporate one or more springs 200, 210 that are each configured to oppose the weight of the implement 150 on the height selection tool 160, which is now described.

The height selection tool 160 has a first spring 200. The first spring 200 has a first end 201 fixed to the vehicle frame 124 and a second end 202 fixed to the first rigid linkage 190, which is best visible in FIG. 2. The first spring 200 exerts a linear force on the linkage 190 that opposes the force on the linkage 190 by the weight of the implement 150 acting on the first bell crank 132 (not visible in FIG. 2, see FIG. 4) and the second bell crank 142. The second end 202 of the first spring 200 is fixed to the first rigid linkage 190 between the first end 191 and the second end 192 of the first rigid linkage 190. More particularly, the second end 202 of the first spring 200 is fixed to the first rigid linkage 190 towards the second end 192 of the first rigid linkage 190, adjacent to where the first linkage 190 and the second bell crank 142 are coupled. In some embodiments, the second end 202 of the first spring 200 is not directly coupled to the second bell crank 142. In various embodiments, the second end 202 of the first spring 200 is not directly coupled to a joint 193 that couples the second end 192 of the first linkage 190 and the second linkage arm 143 of the second bell crank 142. For example, where a bolt pivotably couples the first linkage 190 to the second linkage arm 143, the second end 202 of the first spring 200 is not directly coupled to the bolt. Such a configuration advantageously decreases the bending forces on the bolt to reduce the likelihood of mechanical failure.

Figure 6:
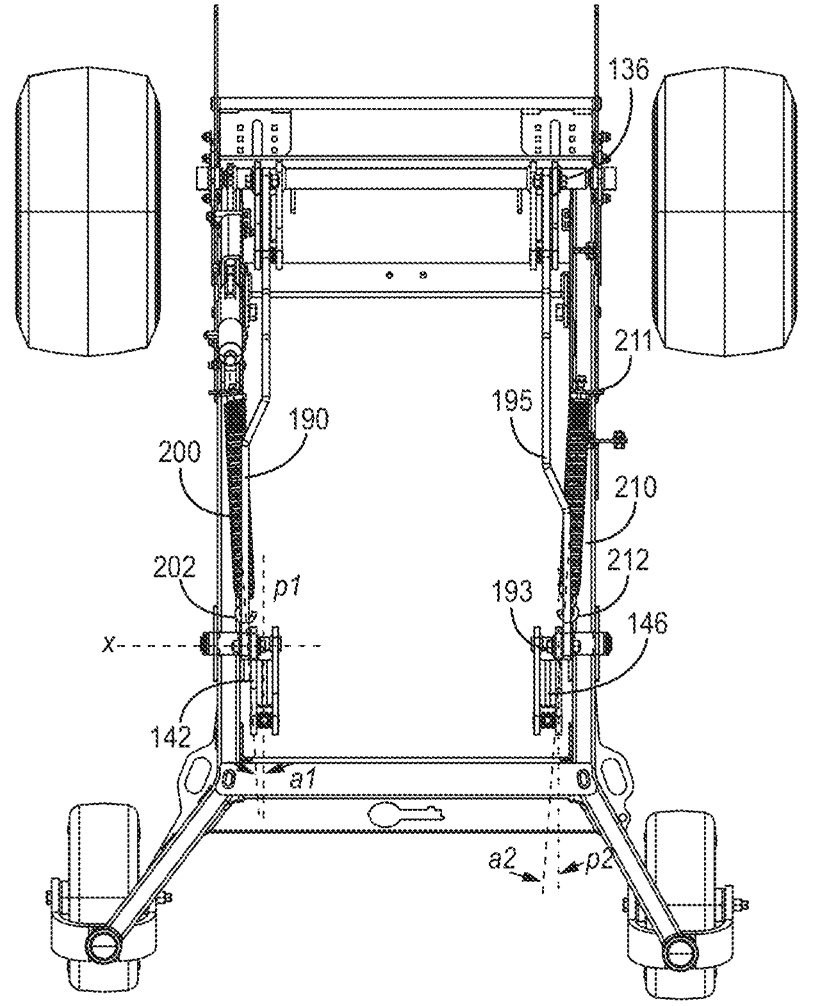
FIG. 6 is a top view of a portion of a vehicle consistent with various embodiments.

FIG. 6 depicts a top view of a portion of the example vehicle 10 herein, with various components omitted for clarity. From this view an angle a1 between the first spring 200 and a plane p1 defined by the second bell crank 142 is visible. The plane p1 is perpendicular to the axis of rotation of the second bell crank 142, which is the first rotational axis x. In various embodiments, the angle a1 between the first spring 200 and the plane p1 defined by the second bell crank 142 is no more than 20°. In some such embodiments, the angle a1 between the first spring 200 and the plane p1 defined by the second bell crank 142 is no more than 15°. In some embodiments, the angle a1 between the first spring 200 and a plane defined by the second bell crank 142 is no more than 10°. In some embodiments the first spring 200 is configured to be generally parallel to the plane p1 defined by the second bell crank 142. "Generally parallel" is defined herein as within 8 degrees of parallel. Such a configuration can advantageously increase the effectiveness of the first spring 200 at counterbalancing the weight of the implement 150 on the first linkage 190.

The height selection tool 160 also has a second spring 210. The second spring 210 has a first end 211 fixed to the vehicle frame 124 and a second end 212 fixed to the second rigid linkage 195, which is best visible in FIG. 3. The second spring 210 exerts a linear force on the second linkage 195 that opposes the force on the linkage 190 by the weight of the implement 150 acting on the third bell crank 136 and the fourth bell crank 146. The second end 212 of the second spring 210 can be fixed to the second rigid linkage 195 consistently with the discussion above relevant to the first spring 200 and the first rigid linkage 190. In some embodiments, the second end 212 of the second spring 210 is not directly coupled to the fourth bell crank 146. In various embodiments, the second end 212 of the second spring 210 is not directly coupled to a joint 193 that couples the second end 197 of the second linkage 195 and the fourth linkage arm 148 of the fourth bell crank 146. For example, where a bolt pivotably couples the second linkage 195 to the fourth linkage arm 148, the second end 212 of the second spring 210 is not directly coupled to the bolt. Such a configuration advantageously decreases the bending forces on the bolt to reduce the likelihood of mechanical failure. A second angle a2 between the second spring 210 and a plane p2 defined by the fourth bell crank 146 is visible in FIG. 6. The description of the first angle a1 and the first plane p1 above generally applies to the second angle a2 and the second plane p2. In various embodiments, the second angle a2 is equal to the first angle a1.

Some vehicles consistent with the technology disclosed herein incorporate a transport lock system that is configured to raise and secure the implement 150 relative to the vehicle frame 124. Such a transport lock system can be used, for example, when the vehicle 10 is being transported, for example. The transport lock system can be integrated with a height adjustment tool 160 such as the height adjustment tool 160 previously described.

Figure 7:
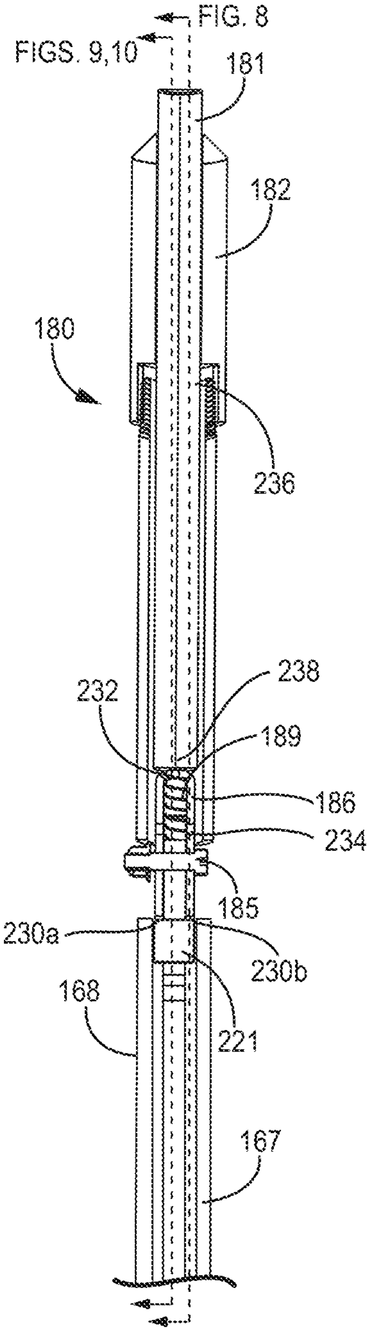
FIG. 7 is a cross-sectional view of a component denoted in FIG. 4.
Figure 8:
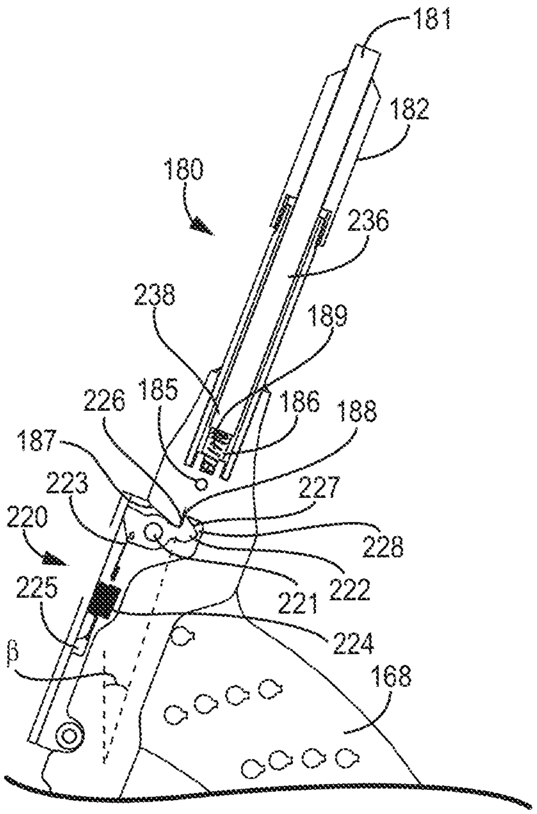
FIG. 8 is another cross-sectional view of a component as denoted in FIG. 7.
Figure 9:
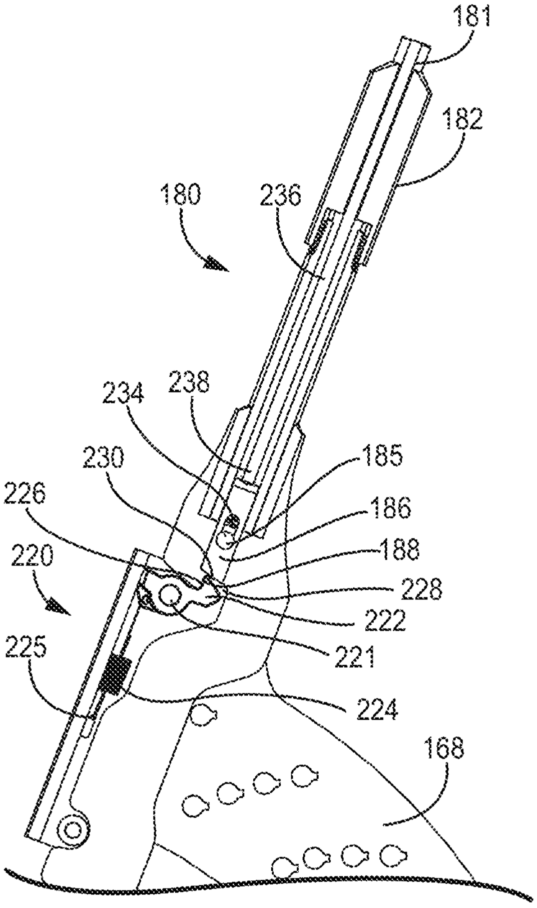
FIG. 9 is yet another cross-sectional view of the component as denoted in FIG. 7.
Figure 10:
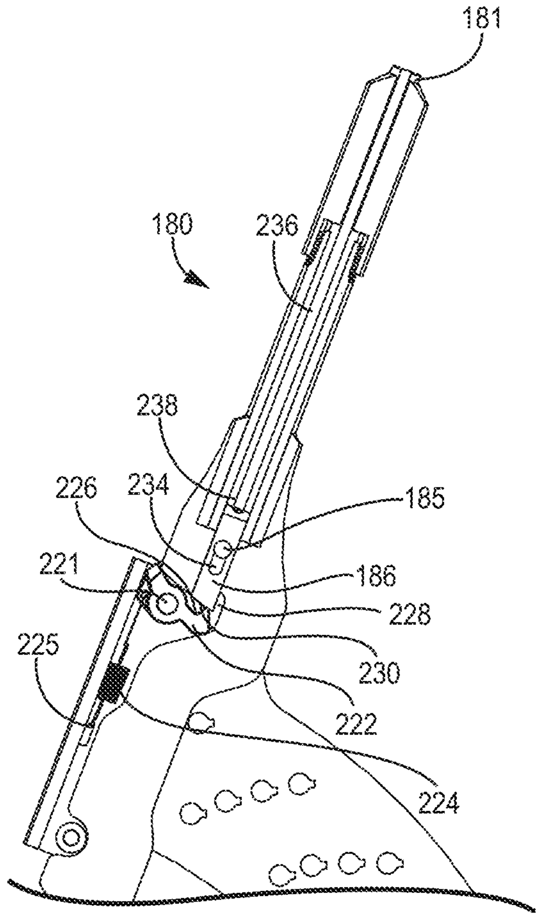
FIG. 10 is the cross-sectional view of FIG. 9 in an alternate configuration.

FIG. 7 depicts a cross-sectional view of a portion of a transport lock system consistent with various embodiments, where the cross-section is represented in FIG. 4. FIG. 8 is a first cross-section through a central portion of the manually engageable mechanism 180 and FIGS. 9-10 are a second cross-section through another portion of the manually engageable mechanism 180, each represented in FIG. 7. FIGS. 1-9 depict the transport lock system in an engaged position, and FIG. 10 depicts the transport lock system in an unengaged position. In the engaged position, the implement 150 is at a maximum vertical position relative to a horizontal ground surface 101 (see FIG. 2). In a variety of embodiments, in the engaged position the transport height $H_T$ (FIG. 2) of the implement 150 is greater than the maximum selectable operating height $H_{op}$ of the implement 150. In the current example, similar to the height selection tool 160, the transport lock system is configured to retain the first shaft 130 in a particular orientation about the second rotational axis y against gravity. In various embodiments, unlike the height selection tool 160, the transport lock system is configured to retain the first shaft 130 in a particular orientation about the second rotational axis y in each direction (rather than in a single direction).

The transport lock system generally uses the manually engageable mechanism 180, which is the handle 180, that has a latched position as shown in FIGS. 8 and 9 and unlatched positions shown in FIG. 10. The transport lock system generally has a latch 222, a latch engagement surface 188, a latch release 186, and a manually engageable button 181.

The latch 222 is pivotably coupled to the vehicle frame 124 (see FIG. 3, for example). The latch 222 is generally configured to releasably engage the handle 180 relative to the vehicle frame 124. In the current example, the latch 222 is pivotably coupled to the first panel 167 and/or the second panel 168. The latch 222 can be pivotably coupled to the vehicle frame 124 at a pivot point 221. In some embodiments, the latch 222 is a component of a latch assembly 220. The latch assembly 220 can be configured to bias the latch 222 in a first orientation. In some such embodiments, the first orientation is consistent with a latched position. In the current example, a latch spring 224 having a first end 223 coupled to the latch 222 and a second end 225 coupled to the vehicle frame 124, such as the second panel 168, biases the latch 222 in towards a latched position.

The latch 222 is configured to engage the latch engagement surface 188 of the handle 180 in the latched position. The latch 222 is disengaged from the handle 180 in the unlatched positions. More particularly, the latch 222 defines a handle engagement surface 226 that is configured to oppose the latch engagement surface 188 of the handle 180. In various embodiments, the handle engagement surface 226 and the latch engagement surface 188 are configured to make direct contact to frictionally engage. As such, in various embodiments, the handle engagement surface 226 and the latch engagement surface 188 are parallel surfaces. Furthermore, the handle engagement surface 226 (and, therefore, the latch engagement surface 188 in some embodiments) can be configured at an angle β from a vertical plane when in a latched position. The angle β can be within 45° from vertical in some embodiments. In various embodiments the angle β is greater than 0° from vertical or greater than 1° from vertical. In some embodiments the angle β ranges from 2° to 10° from vertical. Such a configuration can increase the pressure between the latch engagement surface 188 and the handle engagement surface 226 to reduce the likelihood of unintended disengagement of the latch 222.

In the current example, to engage the transport lock system in a latched position, the handle 180 is pivoted counterclockwise about the second rotational axis y (see FIGS. 3 and 4, for example). The handle 180 is pivoted counterclockwise beyond each of the plurality of pin openings 162, which raises the implement 150 to a vertical position greater than the maximum operating height. As the handle 180 is pivoted, a ramped surface 187 defined by a trailing surface of the handle 180 applies a pivot force to a corresponding surface 227 of the latch 222, which pivots the latch 222 clockwise against the biasing force of the latch spring 224. Continued pivoting of the handle 180 in the counterclockwise direction progresses the ramped surface 187 past the corresponding surface 227 of the latch 222 and the biasing force of the latch spring 224 pivots the latch 222 counterclockwise such that the handle engagement surface 226 is rotated into a latch receptacle 228 defined by the handle 180 and the handle engagement surface 226 is brought into abutting contact with the latch engagement surface 188. The transport lock system is configured to remain engaged until released with a latch release 186.

The latch release 186 is particularly visible in FIGS. 7 and 9-10. The latch release 186 is generally configured to push the latch 222 out of engagement with the latch engagement surface 188. In the current example, the latch release 186 is configured to pivot the latch 222 in the clockwise direction to push the latch 222 out of engagement with the latch engagement surface 188. FIG. 9 depicts the latch 222 in an engaged position, and FIG. 10 depicts the latch release 186 having pushed the latch 222 out of engagement with the latch engagement surface 188. In FIG. 9 the latch release 186 is in a retracted position where the latch release 186 is clear of the latch receptacle 228, and in FIG. 10 the latch release 186 is in an extended position where the latch release 186 extends into the latch receptacle 228. In the extended position the latch release 186 is configured to extend alongside the latch engagement surface 188 of the handle 180. When engaged, the latch release 186 is configured to counteract the latch bias to rotate the latch 222 to the second orientation to push the latch 222 out of engagement with the latch engagement surface 188.

In the current example, the latch release 186 is a rod that is coupled to the handle 180 and linearly translatable relative to the handle 180. The latch release 186 generally has a release surface 230. The rod has a first end 230 that is the release surface 230 and a second end 232 that is the opposite end of the rod from the release surface 230. The release surface 230 is the leading surface of the latch release 186 as it translates towards the latch 222. The release surface 230 is configured to make contact with the latch 222 and push the latch 222 out of the latch receptacle 228 so that the handle engagement surface 226 is pushed out of engagement with the latch engagement surface 188. In particular, the release surface 230 is configured to pivot the latch from its first orientation (FIG. 9), which is the latched position, to a second orientation (FIG. 10), which is an unlatched position. In the current example the latch release 186 is a forked rod defining a u-shape such that the release surface 230 is defined by two parallel release surfaces 230*a*, 230*b* that are particularly visible in the view of FIG. 7. The parallel release surfaces 230*a*, 230*b* are spaced apart and a portion of the handle 180 is disposed between them, where the portion of the handle 180 disposed between the parallel release surfaces 230*a*, 230*b* is visible in FIG. 8. The parallel release surfaces 230*a*, 230*b* are configured to make contact with opposite sides of the latch 222 to push the latch 222 out of engagement with the latch engagement surface 188.

A fastener 185, such as a bolt 185, couples the handle 180 to the latch release 186, and the latch release 186 defines a slot 234 that is configured to accommodate linear translation of the latch release 186 relative to both the handle 180 and the fastener 185. In various embodiments, the latch release 186 is biased to be in a retracted position (such as depicted in FIGS. 7 and 9. In the current example, a latch release spring 189 (FIGS. 7 and 8) is disposed between the latch release 186 and the handle 180 to bias the latch release 186 in the retracted position. The latch release spring 189 can be compressed between the latch release 186 and the handle 180. In this particular example, the latch release spring 189 is positioned between the parallel release surfaces 230*a*, 230*b*. The latch release spring 189 is positioned between the latch release tines defining the forked latch release 186, The manually engageable button 181 is generally coupled to the handle 180 in operative communication with the latch release 186. In various embodiments, the manually engageable button 181 is configured to be depressed by a user to disengage the latch 222 from the latch engagement surface 188. More particularly to the present example, the manually engageable button 181 is configured to be depressed by a user to push the latch 222 out of engagement with the latch engagement surface 188.

In various embodiments, the manually engageable button 181 is defined by a rod 236. The rod 236 has a distal end that is the manually engageable button 181 and a proximal end 238 in mechanical communication with the latch release 186. The manually engageable button 181 extends beyond a distal end of the handle 180 to be depressed by a user. In embodiments consistent with the current example, the proximal end 238 of the rod 236 directly contacts the latch release 186. Furthermore, the latch release spring 189 is configured to bias the manually engageable button 181 (as well as the latch release 186, as mentioned above) in an extended position beyond the distal end of the handle 180, as depicted in FIG. 9. While, in the current embodiment, the manually engageable button 181 and the latch release 186 are defined by two separate components, in some embodiments the manually engageable button 181 and the latch release 186 are defined by a single rod. In some other embodiments, the manually engageable button 181 and the latch release 186 can be defined by more than two rods that form a mechanical communication chain from the manually engageable button 181 to the latch release 186.

In various embodiments, to release the latch 222 from the handle 180, the user pivots the handle 180 slightly in a counterclockwise direction to introduce clearance between the handle engagement surface 226 and the latch engagement surface 188, which eliminates the frictional forces between the surfaces. The manually engageable button 181 is depressed with a force to overcome the biasing force of each of the latch release spring 189 and the latch spring 224. Depressing the manually engageable button 181 linearly translates the rod 236 axially along the handle 180, resulting in translation of the latch release 186 and compression of the latch release spring 189. The latch release 186 translates through the latch receptacle 228 and pushes the latch 222 out of the latch receptacle 228, which pivots the latch 222 in a clockwise direction about the pivot point 221. Pivoting of the latch 222 results in extension of the latch spring 224. The release surface 230 of the latch release 186 obstructs reentry of the latch 222 to the latch receptacle 228. The handle 180 can then be pivoted in a clockwise direction away from the latch 222, which allows the implement 150 (FIG. 2) to be lowered to a selection operating height $H_{op}$ defined by the height selection tool 160, an example of which has been described in detail, above.

Figure 11:
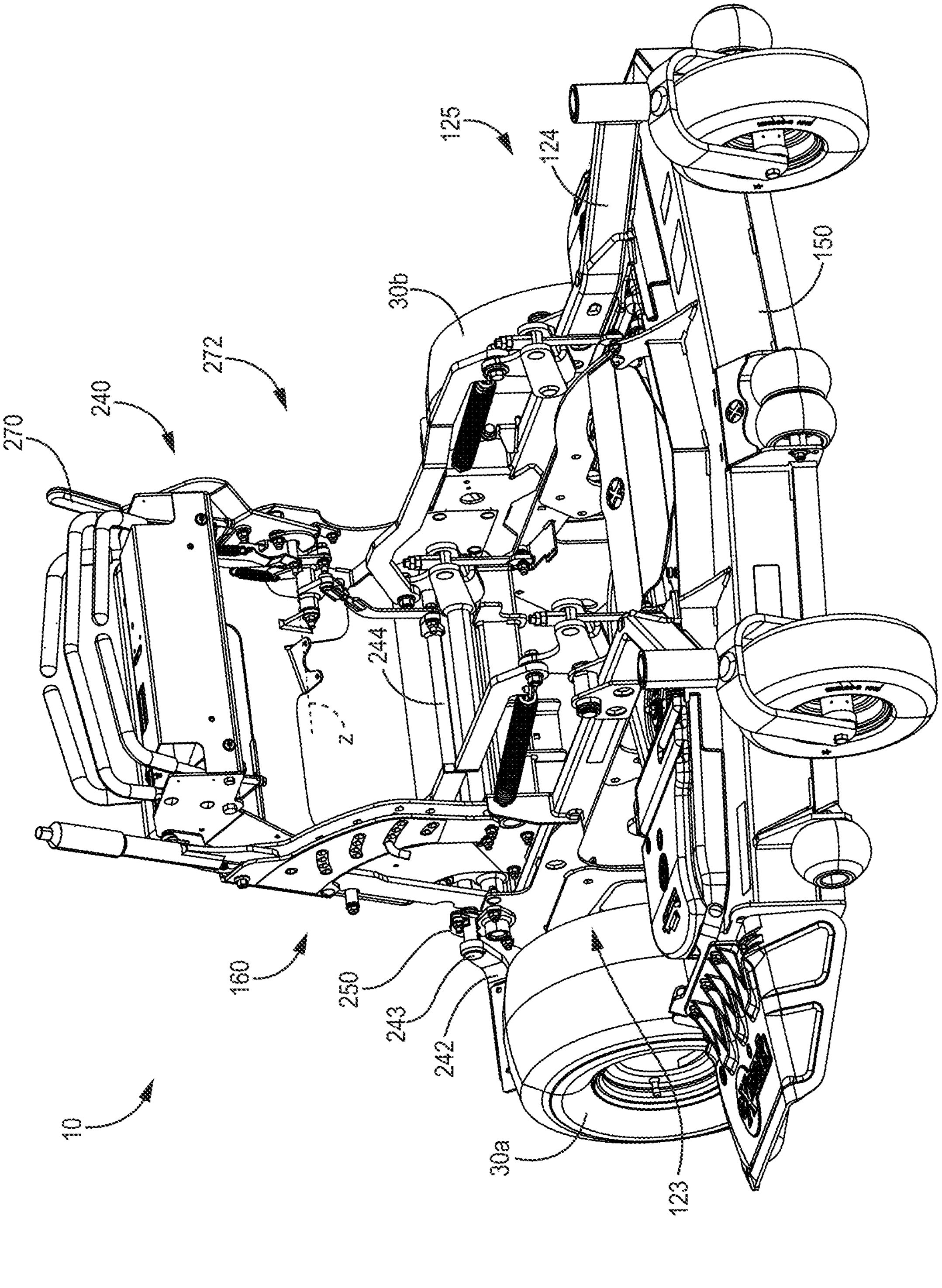
FIG. 11 is a perspective view of a portion of a vehicle consistent with various embodiments.
Figure 12:
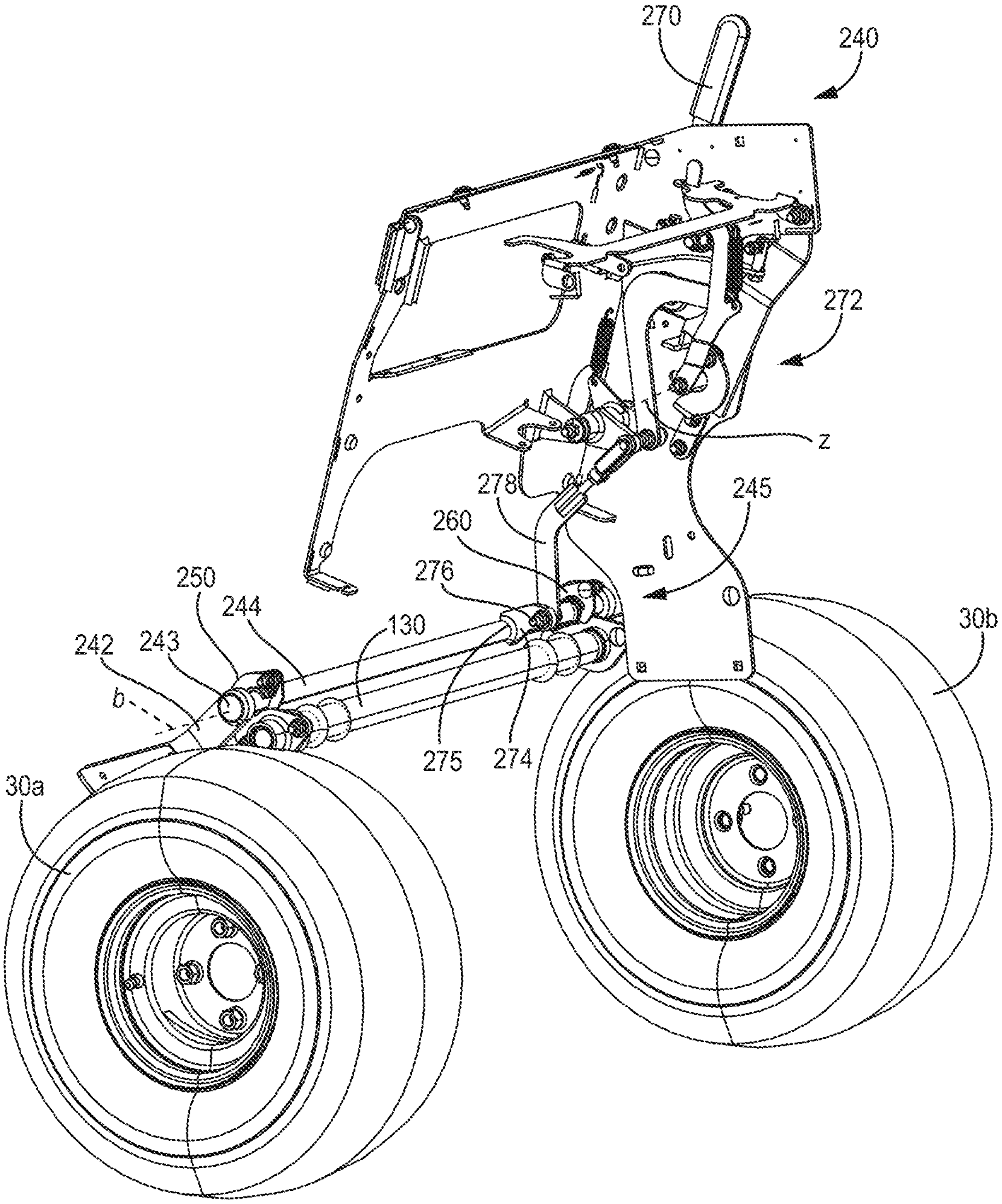
FIG. 12 is a perspective view of an example braking system.

Various aspects of the present technology relate to the integration of a vehicle braking system into vehicles consistent with the present disclosure. The vehicle braking system can be consistent with a parking brake system, for example. FIG. 11 depicts a perspective view of portions of an example vehicle including a braking system 240 consistent with the technology disclosed herein and FIG. 12 depicts a perspective view of the example braking system 240 further isolated from other components of the vehicle 10. The vehicle 10 has at least a vehicle frame 124, drive wheels 30*a*, 30*b* rotatably coupled to the vehicle frame 124 and the braking system 240.

The braking system 240 is generally configured to be selectively engaged by a user to physically obstruct the drive wheels 30*a*, 30*b* from rotating. The braking system 240 has a brake component 242, a brake shaft 244, a first bracket 250, and a second bracket 260 (visible in FIG. 12). The brake component 242 is generally configured to frictionally engage the drive wheel 30*a* when the braking system 240 is engaged by the user. In particular, the brake component 242 has a first position in frictional engagement with the drive wheel 30*a* and a second position outside of frictional engagement with the drive wheel 30*a*. The brake component 242 can be pivotable between the first position and the second position. In particular, the brake component 242 can be fixed to the brake shaft 244 and the brake shaft 244 can be configured to pivot the brake component 242 between the first and second position. In the current example, the brake shaft 244 has a first end 243 and a second end 245, and the brake component 242 is fixed towards the first end 243 of the brake shaft 244.

The brake component 242 can be referred to as the first brake component 242 in various embodiments where there is another brake component ("a second brake component") that is fixed towards the second end 245 of the brake shaft 244 (not currently visible). In such a configuration the second brake component is configured to frictionally engage the second drive wheel 30*b* when the braking system 240 is engaged. The second brake component can be consistent with the description above relevant to the brake component 242.

The first bracket 250 and the second bracket 260 are each fixed to the vehicle frame 124. The first bracket 250 and the second bracket 260 are configured to pivotably fix the brake shaft 244 to the vehicle frame 124. Furthermore, the first bracket 250 and the second bracket 260 are configured to fix the position of the brake shaft 244 relative to another shaft pivotably coupled to the vehicle frame 124. In the current example, the other shaft is the first shaft 130 of the height adjustment tool 160, which has been described in detail above.

Figure 13:
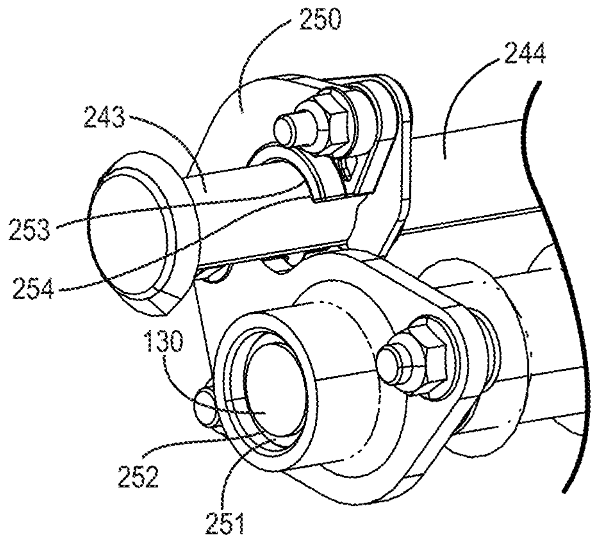
FIG. 13 is a perspective view of an example bracket of the example braking system of FIG. 12.
Figure 14:
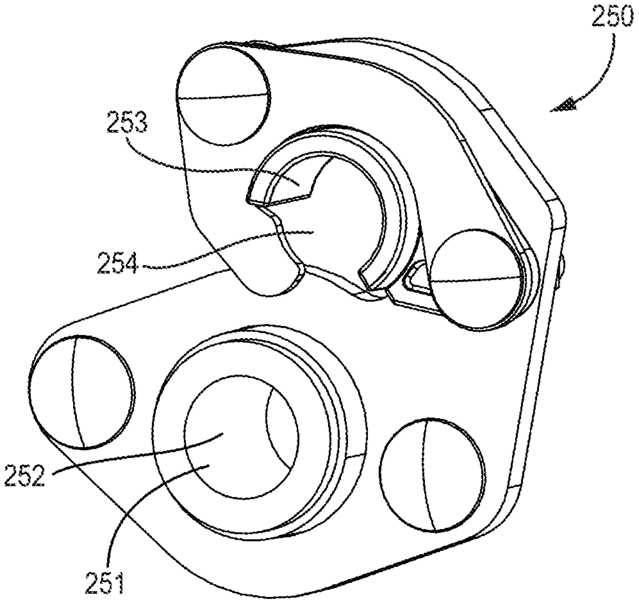
FIG. 14 is a perspective view of the example bracket from a second direction.

FIG. 13 is a detail perspective view of the first bracket 250 pivotably coupled to the first shaft 130 and the brake shaft 244. FIG. 14 is a perspective view of the first bracket 250 alone, from the opposite direction compared to FIG. 13. The first bracket 250 has a first bearing surface 251 defining a first shaft opening 252 and a second bearing surface 253 defining a second shaft opening 254. The first shaft 130 is pivotably disposed in the first shaft opening 252 and the brake shaft 244 is pivotably disposed in the second shaft opening 254. As such, the first bracket 250 advantageously accommodates independent pivoting and/or rotation of the first shaft 130 and the brake shaft 244 while maintaining the positions of each of the shafts relative to the vehicle frame 124 (see FIG. 11).

In various embodiments the first bracket 250 and the second bracket 260 are substantially identical. In various embodiments the first bracket 250 and the second bracket 260 are mirror images of each other. As such, the discussion of the configuration of the first bracket 250 is applicable to the second bracket 260. The first bracket 250 can be coupled to each of the shafts towards the first side 123 of the vehicle frame 124 and the second bracket 260 can be coupled to each of the shafts towards the second side 125 of the vehicle frame 124 (see FIG. 11).

Referring back to FIGS. 11 and 12, the braking system 240 generally has a user interface through which the braking system 240 can be selectively engaged and disengaged. More particularly, in the current example the braking system 240 has a translatable handle 270 that is configured to be manually translated by a user. A mechanical communication chain 272 extends from the translatable handle 270 to the brake shaft 244. The mechanical communication chain 272 elicits pivoting of the brake shaft 244 in a selected direction in response to translation of the translatable handle 270. In various embodiments the translatable handle 270 is pivotable such that pivoting the translatable handle 270 about a handle axis z in a first direction engages the braking system 240, such as by pivoting the brake shaft 244 and, therefore, the brake component(s) 242 in contact with drive wheel(s) 30*a*, 30*b*. In such an example, pivoting the translatable handle 270 in a second direction about the handle axis z disengages the braking system 240, such as by pivoting the brake shaft 244 and, therefore, the brake component(s) 242 out of contact with the drive wheel(s) 30*a*, 30*b*.

In some other embodiments, however, user interface omits a manually translatable handle, and instead incorporates an electromechanical interface in communication with an actuator that is configured to pivot the brake shaft 244 in response to receiving electrical and/or mechanical signal through the user interface. In such an example the user interface can be a button, touch screen, or other user input device.

The mechanical communication chain 272 can have a variety of alternate configurations that are consistent with the technology disclosed herein. In the current example, the mechanical communication chain 272 has a crank 274 (particularly visible in FIG. 12) that extends radially outward from the brake shaft 244. The crank 274 is configured to elicit pivoting of the brake shaft 244 in each direction about a brake shaft axis b. The crank 274 has a first end 275 that is fixed to the brake shaft 244 and a second end 276 that is pivotably coupled to an arm 278. The arm 278 is configured to elicit pivoting of the crank 274 about the brake shaft axis b.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A grounds maintenance vehicle comprising:

a vehicle frame;

an implement coupled to the vehicle frame; and a height selection tool configured to change a vertical position of the implement relative to the vehicle frame, the height selection tool comprising:

a first shaft pivotably coupled to the vehicle frame;

a first bell crank rigidly coupled to the first shaft, the first bell crank defining a first implement arm extending radially outward from the first shaft and a first linkage arm extending radially outward from the first shaft;

a second bell crank pivotably coupled to the vehicle frame about a first axis, the second bell crank defining a second implement arm extending radially outward from the first axis and a second linkage arm extending radially outward from the first axis;

a first rigid linkage coupling the first linkage arm and the second linkage arm, wherein the implement is coupled to the first implement arm and the second implement arm; and a first spring having a first end fixed to the vehicle frame and a second end directly fixed to the first rigid linkage.

2. The grounds maintenance vehicle of claim 1, wherein an angle between the first spring and a plane defined by the second bell crank is no more than 15 degrees.

3. The grounds maintenance vehicle of claim 1, further comprising a first bracket fixed to the vehicle frame, wherein the first bracket has a first bearing surface defining a first shaft opening, wherein the first shaft is pivotably disposed in the first shaft opening, and wherein the first bracket has a second bearing surface defining a second shaft opening and another shaft is pivotably disposed in the second shaft opening.

4. The grounds maintenance vehicle of claim 1, wherein the implement hangs from the first and second implement arms under the force of gravity.

5. The grounds maintenance vehicle of claim 1, further comprising:

a third bell crank rigidly coupled to the first shaft, the third bell crank defining a third implement arm extending radially outward from the first shaft and a third linkage arm extending radially outward from the first shaft;

a fourth bell crank pivotably coupled to the vehicle frame about a second axis, the fourth bell crank defining a fourth implement arm extending radially outward from the second axis and a second linkage arm extending radially outward from the second axis; and a second rigid linkage coupling the third linkage arm and the fourth linkage arm, and wherein the implement is coupled to the third implement arm and the fourth implement arm.

6. The grounds maintenance vehicle of claim 5, wherein the second bell crank is fixed to a second shaft that is pivotably coupled to the vehicle frame and the fourth bell crank is fixed to a third shaft that is pivotably coupled to the vehicle frame.

7. The grounds maintenance vehicle of claim 5, further comprising a second spring having a first end fixed to the vehicle frame and a second end fixed to the second rigid linkage.

8. The grounds maintenance vehicle of claim 1, the height selection tool further comprising a pivotable handle directly fixed to the first shaft.

9. The grounds maintenance vehicle of claim 8, wherein the handle, the first shaft, and the first bell crank are pivotable about a rotational axis.

10. The grounds maintenance vehicle of claim 1, the height selection tool further comprising a locking mechanism configured to obstruct rotation of the first shaft beyond a particular selected orientation among a plurality of selectable orientations.

11. A grounds maintenance vehicle comprising:

a vehicle frame;

an implement coupled to the vehicle frame; and a height selection tool configured to change a vertical position of the implement relative to the vehicle frame, the height selection tool comprising:

a first shaft pivotably coupled to the vehicle frame;

a pivotable handle directly fixed to the first shaft;

a first bell crank rigidly coupled to the first shaft, the first bell crank defining a first implement arm extending radially outward from the first shaft and a first linkage arm extending radially outward from the first shaft;

a second bell crank pivotably coupled to the vehicle frame about a first axis, the second bell crank defining a second implement arm extending radially outward from the first axis and a second linkage arm extending radially outward from the first axis;

a first rigid linkage coupling the first linkage arm and the second linkage arm, wherein the implement is coupled to the first implement arm and the second implement arm; and a first spring having a first end fixed to the vehicle frame and a second end fixed to the first rigid linkage.

12. The grounds maintenance vehicle of claim 11, wherein the handle, the first shaft, and the first bell crank are pivotable about a rotational axis.

13. The grounds maintenance vehicle of claim 11, further comprising a latch pivotably coupled to the vehicle frame, wherein the latch is configured to engage a latch engagement surface defined by the handle in a latched position and be disengaged from the handle in unlatched positions, wherein the latched position defines a maximum vertical distance between the implement and a horizontal ground surface.

14. The grounds maintenance vehicle of claim 13, further comprising a manually engageable button coupled to the handle in operative communication with the latch release.

15. The grounds maintenance vehicle of claim 13, wherein the latch defines a handle engagement surface configured to oppose the latch engagement surface and wherein the handle engagement surface is within 45 degrees from vertical when in a latched position.

16. A grounds maintenance vehicle comprising:

a vehicle frame;

an implement coupled to the vehicle frame; and a height selection tool configured to change a vertical position of the implement relative to the vehicle frame, the height selection tool comprising:

a first shaft pivotably coupled to the vehicle frame;

a pivotable handle fixed to the first shaft;

a first bell crank rigidly coupled to the first shaft, the first bell crank defining a first implement arm extending radially outward from the first shaft and a first linkage arm extending radially outward from the first shaft, wherein the handle, the first shaft, and the first bell crank are pivotable about the same rotational axis;

a second bell crank pivotably coupled to the vehicle frame about a first axis, the second bell crank defining a second implement arm extending radially outward from the first axis and a second linkage arm extending radially outward from the first axis; and a first rigid linkage coupling the first linkage arm and the second linkage arm, wherein the implement is coupled to the first implement arm and the second implement arm.

17. The grounds maintenance vehicle of claim 16, wherein the implement hangs from the first and second implement arms under the force of gravity.

18. The grounds maintenance vehicle of claim 16, the height selection tool further comprising a locking mechanism configured to obstruct rotation of the first shaft beyond a particular selected orientation among a plurality of selectable orientations.

19. The grounds maintenance vehicle of claim 16, further comprising a latch pivotably coupled to the vehicle frame, wherein the latch is configured to engage a latch engagement surface defined by the handle in a latched position and be disengaged from the handle in unlatched positions, wherein the latched position defines a maximum vertical distance between the implement and a horizontal ground surface.

* * * * *